United States Patent
Kolluri et al.

(10) Patent No.: US 7,005,796 B2
(45) Date of Patent: Feb. 28, 2006

(54) FLUID EXCHANGE SYSTEM FOR DISPLAYS

(75) Inventors: Omprakash S. Kolluri, Campbell, CA (US); Larry A. Smith, Hayward, CA (US)

(73) Assignee: Xerox Corporation, Stamford, CT (US)

( * ) Notice: Subject to any disclaimer, the term of this patent is extended or adjusted under 35 U.S.C. 154(b) by 190 days.

(21) Appl. No.: 10/396,625

(22) Filed: Mar. 25, 2003

(65) Prior Publication Data

US 2003/0179167 A1    Sep. 25, 2003

Related U.S. Application Data

(60) Provisional application No. 60/367,312, filed on Mar. 25, 2002.

(51) Int. Cl.
*H01J 5/00* (2006.01)
*H01J 5/02* (2006.01)

(52) U.S. Cl. .................. 313/495; 220/2.1 R; 220/2.2; 220/2.3 R; 445/38; 445/43; 445/53; 445/73

(58) Field of Classification Search ............... 313/495; 445/24, 25; 349/189, 190; 174/17.05; 220/2.1 R, 220/2.2
See application file for complete search history.

(56) References Cited

U.S. PATENT DOCUMENTS

| | | | | |
|---|---|---|---|---|
| 2,704,169 | A | * 3/1955 | Ishler et al. ................ | 220/2.2 |
| 2,887,737 | A | * 5/1959 | Prescott ...................... | 220/2.2 |
| 3,926,502 | A | * 12/1975 | Tanaka et al. .............. | 349/190 |
| 4,126,854 | A | 11/1978 | Sheridon | |
| 4,135,789 | A | 1/1979 | Hall | |
| 4,143,103 | A | 3/1979 | Sheridon | |
| 4,582,210 | A | * 4/1986 | Morimoto et al. ............ | 445/25 |
| 4,684,219 | A | 8/1987 | Cox et al. | |
| 4,839,557 | A | * 6/1989 | Schrank ...................... | 445/25 |
| 5,246,042 | A | * 9/1993 | Farrell ........................ | 141/59 |
| 5,389,945 | A | 2/1995 | Sheridon | |
| 6,396,621 | B1 | 5/2002 | Sheridon | |
| 6,696,796 | B1 * | 2/2004 | Park ............................ | 445/25 |

FOREIGN PATENT DOCUMENTS

| WO | WO 98/28729 A | 7/1998 |
|---|---|---|
| WO | WO 01/79920 A | 10/2001 |

* cited by examiner

*Primary Examiner*—Mariceli Santiago
(74) *Attorney, Agent, or Firm*—Pillsbury Winthrop Shaw Pittman LLP

(57) ABSTRACT

A display device is described which includes a fluid exchange device mated to the display housing. The fluid exchange device makes a fluid tight seal with the display housing and includes a sealing member which may be perforated by a conduit. The conduit provides for the flow of fluids into and away from a cavity within the display device that is used to contain a display medium. The fluid exchange device provides a fluid tight seal with the housing, and the sealing member reseals itself upon withdrawal of the conduit from the sealing member.

16 Claims, 7 Drawing Sheets

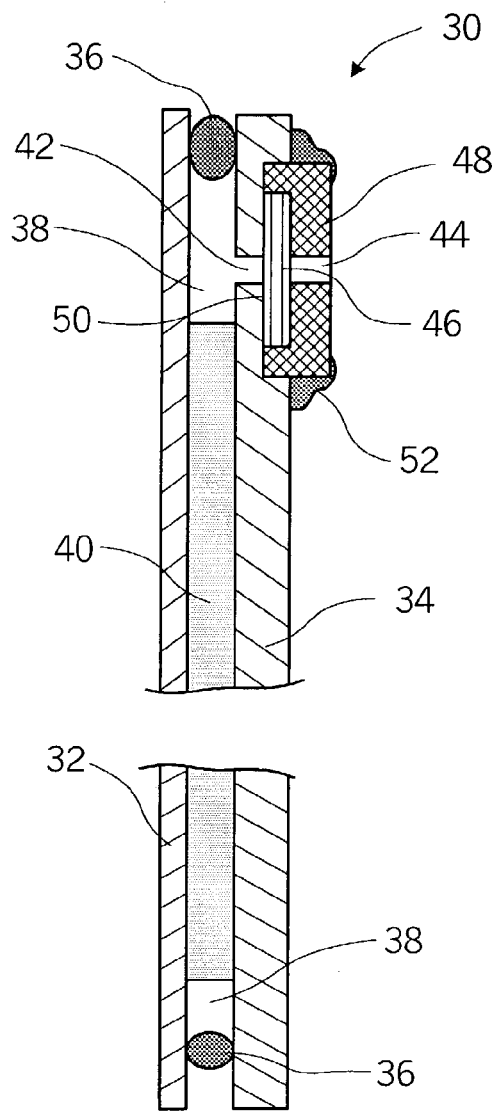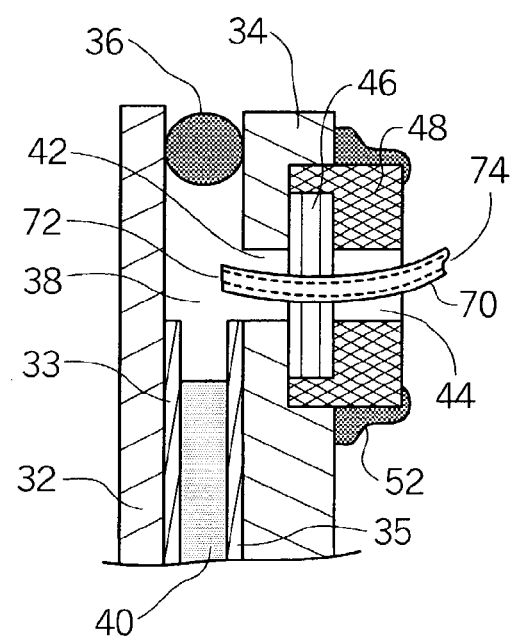
FIG. 2b
FIG. 2a

FLUID EXCHANGE SYSTEM FOR DISPLAYS

CROSS-REFERENCE TO RELATED APPLICATIONS

This application claims priority to U.S. Provisional Patent Application Ser. No. 60/367,312 filed on Mar. 25, 2002, the contents and references of which are incorporated herein by reference in its entirety.

BACKGROUND

Display technologies based on the directed movement or rotation of particles suspended in a fluid medium are currently being developed to store and retrieve information. Such displays may find use in computer displays, PDA's, electronic signs, and electronic books.

One such technology, called gyricon displays, but also known by other names such as electrical twisting-ball displays or rotary ball displays, see U.S. Pat. Nos. 4,126,854 and 4,143,103 the contents of which are incorporated herein by reference in their entirety, were first developed over twenty years ago. In a gyricon display bichromal balls or cylinders, which are electrically anisotropic, may be suspended in a dielectric medium between addressable electrodes on surfaces making up the display housing. The balls or cylinders are electrically dipolar in the presence of the fluid and so are subject to rotation upon application of an electric field, as by matrix-addressable electrodes. The electrode closest to the viewing surface of the display is preferably transparent. An observer viewing the display sees an image formed by the black and white pattern of the balls or cylinders as rotated by the matrix-addressable electrodes to expose their black or white faces to the viewing surface.

Besides gyricon technology, other display technologies utilizing suspended particles in a fluid medium include: rod-shaped or plate-like colloidal particles that are suspended in a fluid and which become aligned thereby permitting the formation of images by restriction or passage of light upon application of an external electric field; and charged micro-particle suspended in a dielectric fluid which are electrophoretic and move to create an image upon application of an external electric field.

Gyricon displays in particular have numerous advantages over conventional electrically addressable visual displays, such as LCD and CRT displays. They are suitable for viewing in ambient light and retain an image indefinitely in the absence of an applied electric field which reduces power consumption by the display and is an important advantage for this technology in portable display applications. Gyricon displays may also be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reusable (and thus environmentally friendly) substitute for ordinary paper. For further advantages of the gyricon display, see U.S. Pat. No. 5,389,945, the contents of which are incorporated herein by reference in their entirety.

In the fabrication of display devices utilizing suspended particles in a fluid display medium, for example point of purchase displays which are designed to contain the display medium in an enclosure, it is important to maintain a specified fluid level in the display and to exclude gases like air from the display housing system. In the course of fabrication of these devices, there is a certain amount of air that is trapped in the system. It is important to remove this air so that there is intimate contact between the housing packaging elements and or electrodes of the display, and the display medium. Furthermore, in order to maintain the proper fluid level in the package, it is important that the fabricator of the display be able to temporarily breach the package to remove air, remove excess fluid, or to add fluid to the package without compromising the integrity of the sealed display package.

One method of accomplishing the above objective is to provide a means of ingress into the package and attach a valve at the other end. However, such devices are bulky and expensive to produce in the miniature sizes desired for display use. Another approach to this problem is to incorporate small-bore tubing in the package where the tubes could be pinched shut after use. This approach suffers from the problem of continuing leakage from the tubes. Thus a reliable means of temporarily breaching the package seal is required while maintaining seal integrity. The sealing system must be small enough to fit within the housing constraints specified for these devices.

SUMMARY

The invention pertains to visual display housings and display media contained in such housing where particles suspended in the fluid display media are used to form an image upon application of an electric field to the display media. More particularly the invention relates to a fluid exchange device that allows transfer of fluids into and out of sealed packages such as gyricon visual displays and electronic displays.

In one embodiment of the present invention is a display device that includes a housing having a first member and a second member facing one another and separated by a fluid tight seal between them. The first and second members each have electrodes or addressable electrode assemblies which are electrically isolated from each other and used for moving or orienting suspended particles included in the display fluid medium. The separated and facing housing members define a cavity or space of the display housing for containing the display medium. Passing though the housing and in fluid communication with the cavity is a fluid exchange device. The fluid exchange device is in fluid communication with the cavity and makes a fluid tight seal with a surface of the housing. The fluid exchange device includes a sealing member that separates the cavity containing the display medium from the outside or external environment. The sealing member is preferably and elastomeric material that seals around or envelops a conduit which is used to perforate the sealing member; the conduit allows for the flow of fluid into and away from the display device housing cavity.

In one embodiment the sealing member is replaceable. In another embodiment, the sealing member may be coated with another material, preferably a hydrophobic material.

In yet another embodiment, the fluid exchange device includes a plurality of ports through which transfer conduits may be inserted into the cavity for simultaneous flow of fluids into and away from the cavity. Alternatively, there may be more than one fluid exchange device on the display device housing for simultaneous flow of fluids into and away from the cavity. The fluid exchange device is preferably located on the rear member of a display device. However it may also be placed on the front member or on a side edge or surface of a molded or fusion bonded display housing so long as it provides fluid communication with the display device space or cavity and facilitates the flow of fluid into or away from the cavity. The lower limit for the size of the fluid exchange and sealing member of the present invention is dictated by the ease with which each of the components can be fabricated.

In yet another embodiment of the present invention, a method for flow of fluid into or out of a cavity in a display device which utilizes suspended particles in a fluid medium to form an image upon application of an external electric field is provided. The method includes flowing a fluid through a conduit that perforates a sealing member of a fluid exchange device included with the display device. The fluid exchange device is in fluid communication with a cavity defined by surfaces or electrodes of the display housing. The conduit has an inlet and an outlet and is surrounded or enveloped along a portion of the conduit by the sealing member that it perforates. The conduit provides a path for flow of fluid into and away from the cavity.

In another embodiment, the flow of fluid through the conduit is stopped by removal of the conduit from the perforated sealing member. The sealing member re-seals the perforation and maintains the fluid and pressure integrity within the display device cavity.

In yet another embodiment of the present invention, fluid transfer into and away from the display device cavity containing the display medium occur simultaneously.

DESCRIPTION OF THE DRAWINGS

In part, other aspects, features, benefits and advantages of the embodiments of the present invention will be apparent with regard to the following description, appended claims and accompanying drawings where:

FIG. 2a is a cut away section view illustrating an embodiment of the present invention, and FIG. 2b is an expanded section view illustrating a conduit perforating a sealing member of a fluid exchange device;

DETAILED DESCRIPTION

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims. Preferred dimensions for embodiments of the present invention are contained within the drawings of U.S. Provisional Patent Application Ser. No. 60/367,312 filed on Mar. 25, 2002, the contents of which are incorporated herein by reference in its entirety.

It must also be noted that as used herein and in the appended claims, the singular forms "a", "an", and "the" include plural reference unless the context clearly dictates otherwise. Thus, for example, reference to a "gas" is a reference to one or more gases and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

Embodiments of the present invention include a display device having a fluid exchange device mated to the display housing. The fluid exchange device of the present invention allows for the removal of trapped gases from a display device. These gases, such as air, may have been introduced to the display device during manufacturing and/or air that has entered the display device through permeation or outgassing of components. The fluid exchange device also allows the user to replenish the fluid level that is maintained in such displays. In use, the user perforates a sealing member in the fluid exchange device with a fluid transfer conduit. The conduit may be connected to a vacuum source for removing fluids such as air, or the conduit may be connected to a pump and a fluid source for introducing additional fluid into the display device cavity. The sealing member device is self-sealing such that upon withdrawal of the fluid transfer conduit, the perforation in the sealing member is closed or resealed, and the pressure integrity of the display device cavity is maintained. The invention may also be used for other displays and other sealed packages by incorporation of such a fluid exchange device.

Figure 1:
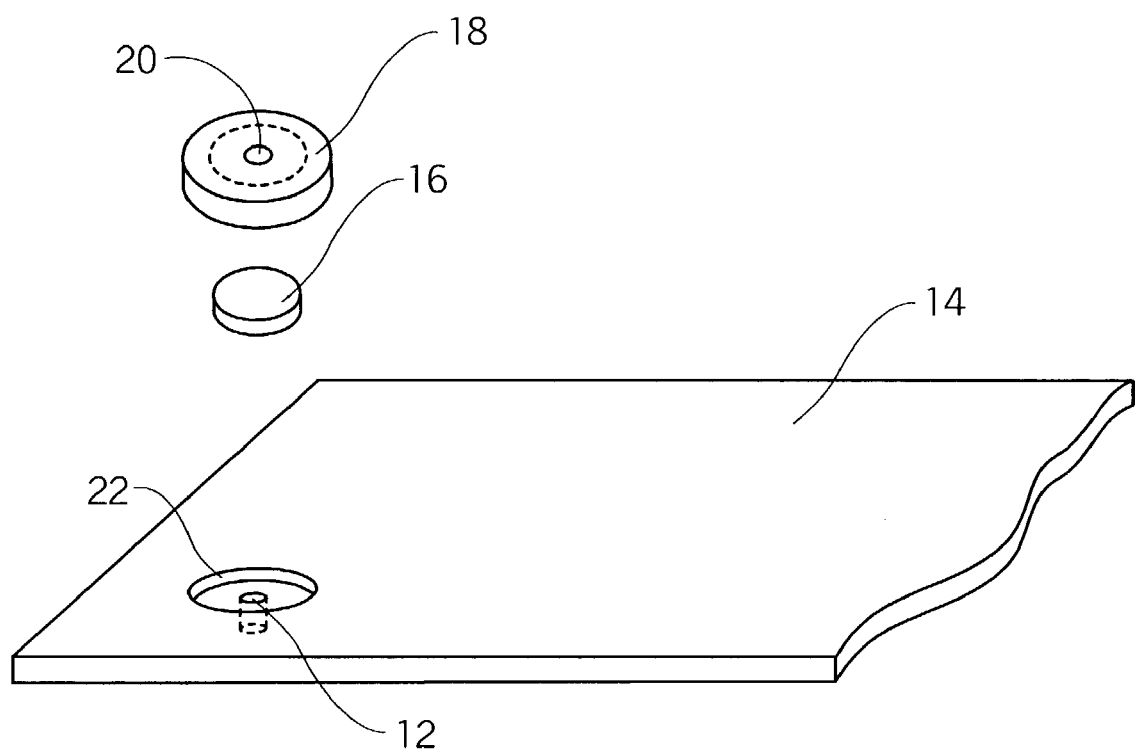
FIG. 1 is a partially exploded view of an embodiment of the present invention, wherein a fluid exchange device is illustrate located near a corner of a display device housing member.

One embodiment of the present invention is illustrated schematically in FIG. 1 and includes a circular recess 22 created in a member 14 of the display housing. The member 14 has a through hole 12 leading to the interior of a display device or sealed package (not shown). A sealing member 16, which may be a silicone disc or septum of the appropriate diameter and thickness, is then placed into the recess 22. The sealing member 16 is held in the circular recess 22 of the housing member 14 by retainer 20 which includes a retainer through hole 20. The retainer through hole 20 allows for insertion and perforation of the sealing member 20 by a conduit or needle (not shown).

Referring now to FIG. 2a, an illustration of an embodiment of the present invention includes a housing that has a first member 32 and a second member 34 separated by a fluid tight seal 36 between them. Each member of the housing includes an electrode or matrix addressable electrode assembly that is electrically isolated from the electrode or assembly on the other member (as disclosed in U.S. Pat. No. 4,126,854) for orienting, moving, or rotating the suspended particles in the display medium. For example and as illustrated in FIG. 2b, first member 32 has a first electrode 33 and second member 34 has a second electrode 35 separated by a fluid tight seal 36 extending around the periphery of the display and located between the members. The separated members define a space or cavity 38 which may contain a display medium 40 between the members.

Passing though one of the housing members is a fluid exchange device 30. The fluid exchange device includes a sealing member 46 and a retainer 48; the sealing member 46 covers housing member through hole 42 and makes a fluid tight seal with a housing member surface at interface 50. The sealing member 46 is compressed into this surface interface 50 by retainer 48 which is held in place by a fastener 52. The fastener 52 may be but is not limited to adhesives like epoxy, threaded retainers mating with a threaded housing member, bolts connected to the housing member and distributed about the periphery of the retainer for holding the retainer to the housing member, crimped caps for securing the sealing member about a suitable housing member, or fusion bonding of the retainer to the housing member. As illustrated in FIG. 2b, the retainer 48 has a retainer through hole 44 through which a conduit 70 may be inserted and used to perforate sealing member 46. The conduit 70 has a first opening 72 and second opening 74 for the flow of fluid into or away from the cavity 38. The sealing member 46 separates the cavity 38 which may contain a display medium 40 from the outside environment. The sealing member 46 is in fluid communication with the cavity 38 via member through hole 42. The sealing member 46 is preferably an elastomeric material that may be perforated by and seals around or envelops the conduit 70.

The fluid exchange device in FIG. 2a and FIG. 2b may include a plurality of through holes or ports like 44 in the retainer 48 and or member through holes 42. Multiple through holes (not shown) may permit a plurality of conduits to be inserted into the sealing member 46 for transfer of fluid into or away from the cavity 38. There may also be more than one fluid exchange device 30 mated to the display device housing member or edges (not shown). More than one fluid exchange device 30 may be mated to opposing housing members or housing edges.

Display devices useful in the present invention may include but are not limited to those with a display media that is sandwiched between housing members, plates, or surfaces. The members typically have electrodes associated with them for moving or orienting particles in the display medium. The electric field from the electrodes is used to form an image from the particles in the display medium. Such displays and display media may include but are not limited to orientation of suspended plate-like or rod-shaped particles in a dielectric fluid medium, movement of magnetic particles in a fluid; rotation of spherical particles with electrical and optical anisotropy in a dielectric fluid under a applied electric field, or movement of charged microparticles suspended in a dielectric fluids. Such displays may generally be referred to as point of purchase displays.

Figure 4:
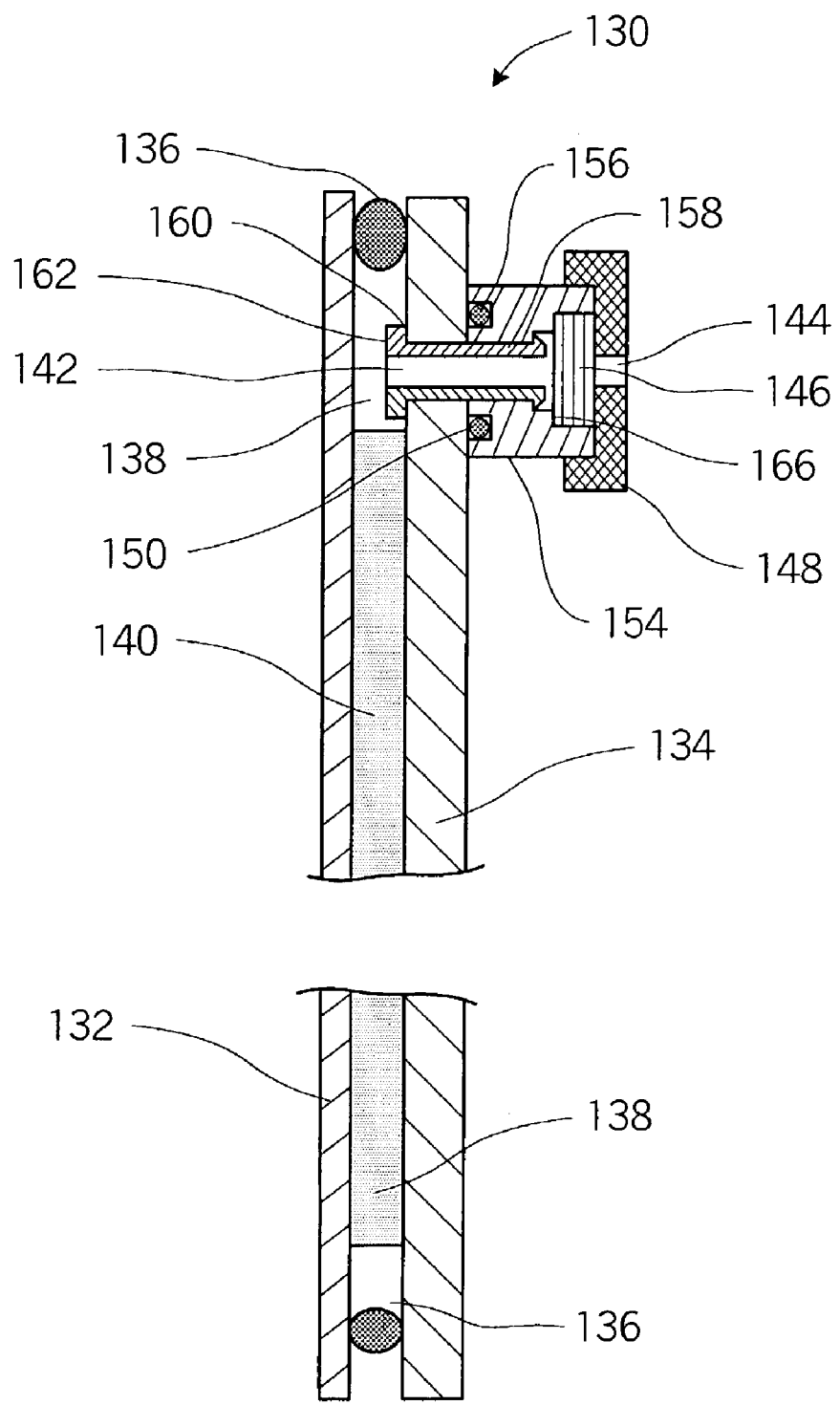
FIG. 4 is a section view showing another embodiment of a fluid exchange device of the present invention.

More specifically, the housing for a display of the present invention includes at least one transparent member or surface, and a second member or surface which may be referred to as a rear surface. The rear surface may or may not be transparent. The transparent or viewing member and the rear member have electrodes enclosed between them for rotating or moving the particles suspended within the fluid of the display medium. The front and rear members are separated by a sealing material or adhesive and together form a cavity between the surfaces for containing the fluid and the particles also called a display medium. The seal 36 between the surfaces of member 32 and member 34 in FIG. 2a, or the seal 136 between the surfaces of member 132 and member 134 in FIG. 4a may be formed by a preformed fluoroelastomer gasket material such as Viton® between the members. Alternatively the members may be spaced apart and then an elastomeric compound or adhesive such as silicone or epoxy used to form a seal and bond around the periphery of the member surfaces and thereby form a cavity for the display material. Housings with a molded cavity may also be utilized, or housing members with raised edges may be fusion bonded together or ultrasonically bonded together to form a cavity 38 as shown in FIG. 2a or a cavity 138 as shown in FIG. 4 for the display media. Housing members bonded by fusion or ultrasonic bonding methods may not appear as separate surfaces. However, the electrodes or addressable electrodes and the accompanying mechanical support provided by the member still define a cavity for containing the fluid and suspended particles of the display medium.

The housing members 32 and 34 in FIG. 2b and the housing members 132 and 134 in FIG. 4, which define the housing cavity 38 and housing cavity 138 respectively, also include electrodes 33 and 35 in FIG. 2b (electrodes not shown in FIG. 4). The electrodes are electrically isolated from one another and comprised of materials like indium tin oxide know to those skilled in the art. The electric field provided by the electrode assembly causes rotation, alignment, or movement of the particles suspended in the fluid that makes up the display media. The electrodes may also be used to generate a magnetic field which may be useful for rotating or moving magnetic particle in a display medium. It is preferable that intimate contact be maintained between the display medium and the electrodes to effect movement, rotation, or alignment of the particles. The electrode assembly matrix may be either an active or a passive matrix addressing scheme.

The fluid exchange device is preferably located on the rear member of a display device. This is illustrated in FIG. 2a by member 34, and in FIG. 4 by member 134. However, the fluid exchange device may also be placed on the front member or a side edge of a molded or fusion bonded housing so long as it provides fluid communication with the cavity of the display device and forms a fluid tight seal with the housing. A through hole in the housing member, as illustrated in FIG. 2a by member through hole 42, and in FIG. 4 by member through hole 142 provides fluid communication between a sealing member and the cavity. For example, through hole 42 in FIG. 2 and through hole 142 in FIG. 4, permits flow of fluid into or out of the cavity 38 in FIG. 2 and the cavity 138 in FIG. 4. The interior of the display device may additionally be molded or sealed to provide a high point or position (not shown) within the cavity to facilitate the addition or removal of a fluid through the fluid exchange device. The fluid exchange device may be positioned at or near this apex. Such an apical position in the housing cavity may be useful for removal of trapped gas or for the addition of fluid and displacement of gas. The fluid exchange device 30 in FIG. 2a and fluid exchange device 130 in FIG. 4 may be hidden by external molding (not shown) and or held in place by such molding in place of a fastener 52 shown in FIG. 2a, or an arbor 158 as shown in FIG. 4.

It may be desirable to mount more than one fluid exchange device on the housing so that, for example, when filling the a display device cavity with a liquid, any trapped vapor or gas in the cavity may be simultaneously displaced from the cavity. Alternatively, a single fluid exchange device may be breached or perforated with one or more transfer conduits such that the fluid flows in one conduit and out of the second conduit. Lastly the sealing member may be perforated using concentric or eccentric tubes as transfer conduits such that the fluid flows in one conduit and out of the second conduit.

When the sealing member 46 is perforated, as for example by a conduit 70 as shown in FIG. 2b, fluid may flow into or out of the cavity 38. Removal of the conduit from the sealing member 46 reseals perforation in the sealing member 46. Resealing of the sealing member 46 upon withdrawal of the conduit 70 from the perforation retains the fluid or pressure integrity within the cavity 38. The fluid exchange device 30 holds the sealing member 46 in place, prevents dislocation of the sealing member during perforation, and also provides a fluid tight seal with the housing member 34. The sealing member 46 in the fluid exchange device may be replaced by removal of the fastener 52 and retainer 48.

Figure 3A:
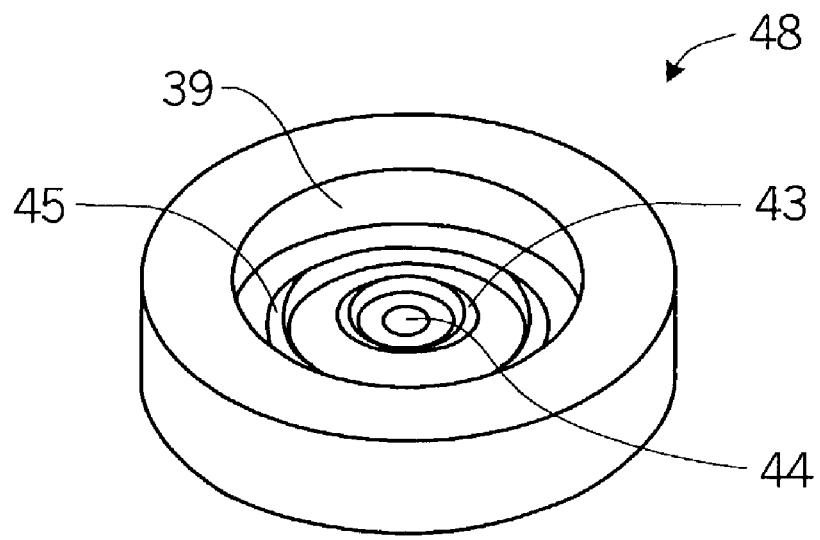
FIGS. 3a and 3b are perspective and section views respectively of a retainer used in an embodiment of a fluid exchange device of the present invention shown in FIG. 2.
Figure 3B:
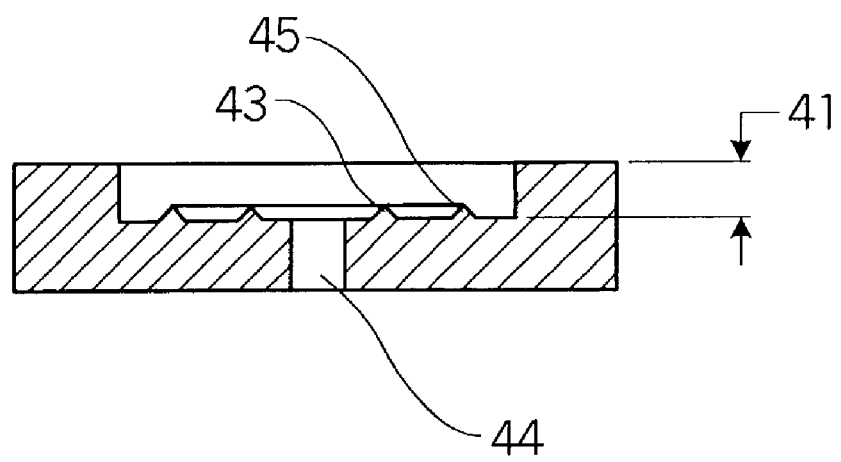
Figure 5A:
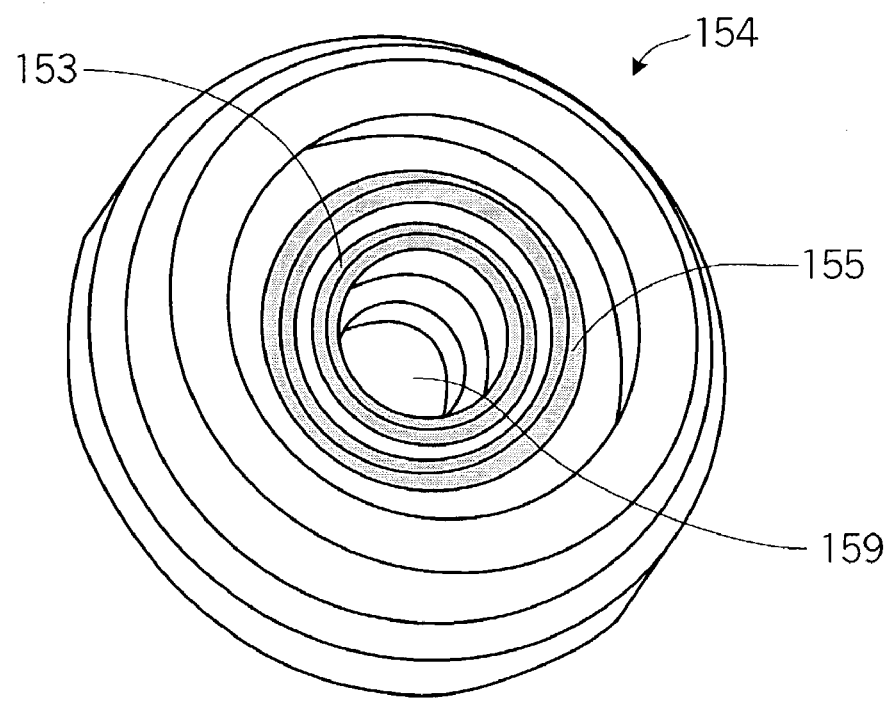
FIGS. 5a and 5b are perspective and section views respectively of a sealing member housing suitable for use in the embodiment of the fluid exchange device of FIG. 4.
Figure 5B:
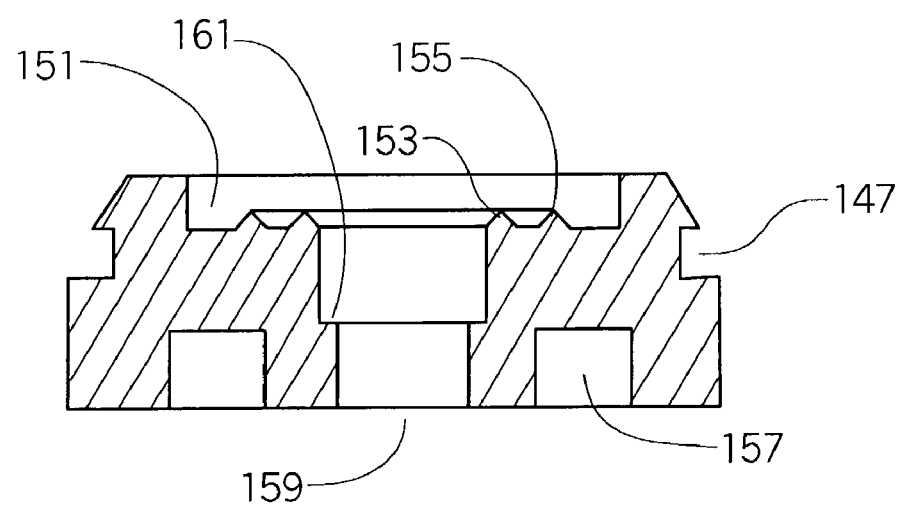
Figure 6A:
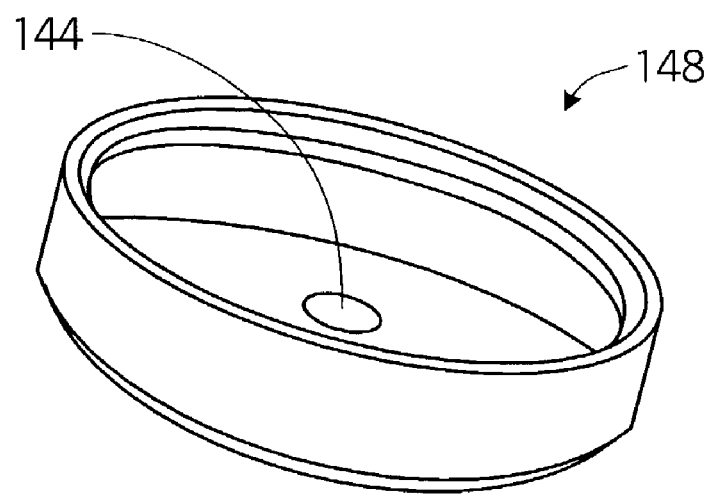
FIGS. 6a and 6b are perspective and section views respectively of a retainer suitable for use in the embodiment of the fluid exchange device of FIG. 4.
Figure 6B:
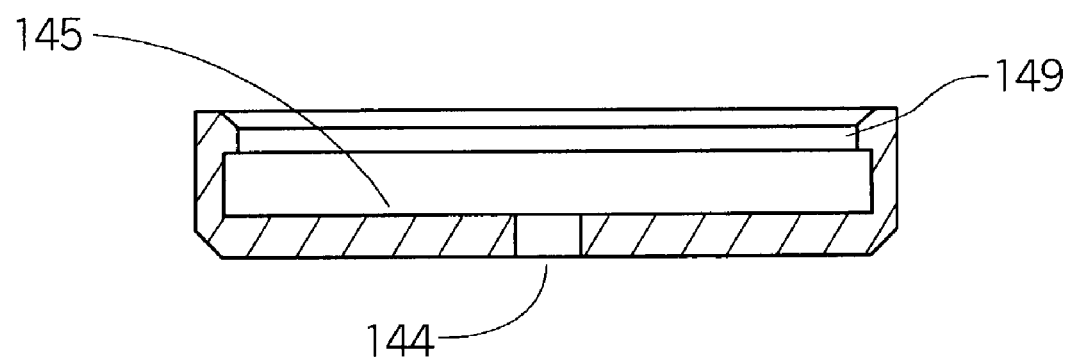

A fluid tight seal for purposes of the present invention is one which provides an inboard leak rate of less than about $10^{-7}$ atm-cc/sec helium and preferably at less than $10^{-9}$ atm-cc/sec of helium prior to perforation of the sealing member. A fluid tight seal of the fluid exchange device or its components with a housing member surface may be formed in a variety of ways including but not limited to use of a retainer 48 shown in FIG. 2a, and shown in more detail in FIG. 3a, which compresses and holds a sealing member 46 between the retainer 48 and the housing member 34. The seal is preferably formed by compression of the sealing member 46 by one or more enclosed raised edges or beads, for example 43 and 45, on the surface of the retainer 48 as shown in FIG. 3b. The enclosed raised edges 43 and 45 may be surrounded by a rim 39 of the retainer 48. Similar raised edges may be located on a housing member surface, the surface of a recess of a housing member, or on both the retainer and housing member(not shown). These may also be used to form a fluid tight seal between a sealing member and a retainer. A sealing member with a ridge may be compressed into a groove on the retaining ring or into a groove in a housing member to effect a similar seal (not shown). The housing member 34 may or may not have a recess for the sealing member as illustrated in FIG. 2a. For example, a housing member with a though hole may have a cup like fixture with its own through hole bonded to the housing member. This fixture may be used for retention and compression of a sealing member with a retainer. A fluid tight seal of the fluid exchange device and its sealing member with a housing member surface may also be made as illustrated in FIG. 4. A sealing member 146 may be held or compressed in place between a retainer 148 and a sealing member housing 154. The sealing member housing 154, detailed in FIG. 5b, has enclosed raised ridges 153 and 155 for sealing against a sealing member 146. The sealing member housing 154 is secured to the housing member 134 by an arbor 158 and o-ring 156 to form a seal against the housing member 134. A retainer 148 shown in FIG. 4, and shown in more detail in FIG. 6a, compresses and holds the sealing member 146 between the retainer 148 and the sealing housing member 154. The seal is preferably formed by compression of the sealing member 146 by one or more enclosed raised edges or beads 153 and 155. Other seals may be made and used in the practice of this invention as would be known to those skilled in the art.

Figure 7A:
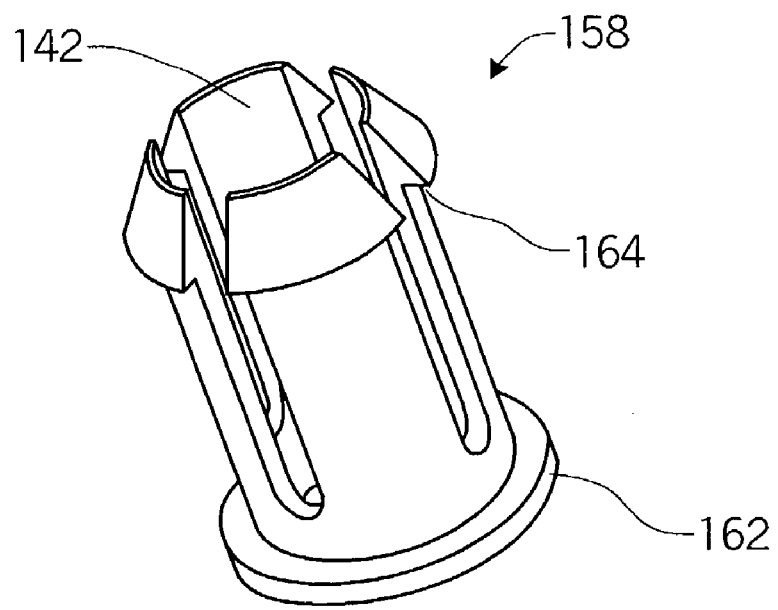
FIGS. 7a and 7b are perspective and section views respectively of an arbor suitable for use in an embodiment of the fluid exchange device of FIG. 4.
Figure 7B:
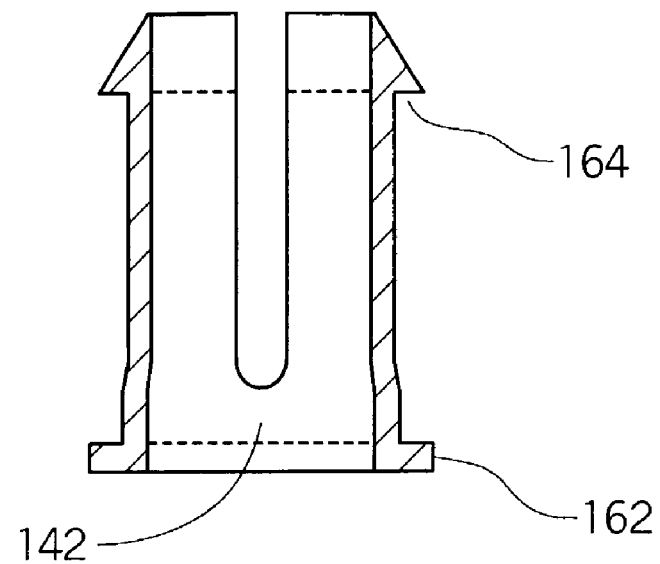

As shown in detail in FIG. 7a, arbor 158 has a flange 162 that is engaged with a housing member surfaces at 160 and also provides a through hole 142 for one or more fluid transfer conduits. The arbor 158 functions to compress an o-ring 156 located in a groove 157 (FIG. 5) of the sealing member housing 154 against the display housing member 134. Alternately, the o-ring groove may be formed into the housing member (not shown) rather than the sealing member housing. The arbor 158 passes through arbor hole 159 in sealing member housing 154. The corner 164 of the arbor 158, shown in detail in FIG. 7b, engage the sealing member housing 154 along the sealing member housing ledge 161 (shown in detail in FIG. 5). Engagement of the sealing member housing 154 by the arbor 158 forms a fluid tight seal. The width and depth of the sealing member housing groove 157 is sized to provide a nominal squeeze to an o-ring in relation to the o-ring cross section consistent with design criteria known to those skilled in the art for providing fluid tight seals. Where an o-ring is used to form a seal it is preferably made from an elastomeric compound like Viton or Kalrez®, however poly(tetrafluoroethylene) or indium o-rings may be also be used. The choice of material is dictated by the fluid contained within the display since it is desirable to avoid failure of the o-ring due to chemical attack from the environment or from the display fluid that comes in contact with the o-ring seal. For this reason, other o-ring materials may be chosen depending on the fluid within the display cavity. In this version, the features or raised ridges 153 and 155 are created in the sealing member housing rather than in the retainer or cap 148. The retainer cap is secured to the sealing member housing mechanically with a snap fit between 147 and 149 which compresses o-ring 156 within groove 157. This embodiment avoids the necessity of using adhesives to bond the housing to the display device and thus reduces the time required for manufacturing these devices. The retainer 148 or sealing member housing 154 may also be held in place to effect a seal by use of a fastener such as but not limited to adhesives like epoxy, threaded retainers mating with a threaded housing member, bolts connected to the housing member and distributed about the periphery of the retainer for holding the retainer to the housing member, crimped caps for securing the sealing member about a suitable housing member, or fusion bonding of the retainer to the housing member. The retainer 148 of the fluid exchange device 130 has at least one retainer through hole 144 in FIG. 4, for insertion of at least one transfer conduit (not shown) that may be used for flow of fluid into or out of the display device cavity.

The surface finish of the housing in the region of the o-ring seal, raised edges or beads, and or the recessed grooves of the present invention should be sufficiently smooth to prevent leak paths flow of fluid into or out of the housing. Suitable surface finishes could be determined or would be known to those skilled in the art.

Sealing member 46 in FIG. 2a or sealing member 146 in FIG. 4 should retain fluids in the cavity of the housing. Fluid may flow may occur when the sealing member is perforated or punctured by conduit. The sealing member should be chemically compatible with the fluids in the housing cavity and fluids generated by operation of the device. The choice of material is dictated by the fluid contained within the display since it is desirable to avoid failure of the sealing member due to chemical attack from the environment or from the display fluid that comes in contact with the sealing member. For this reason, various sealing member materials may be chosen depending on the fluid within the display cavity. The sealing member may be an elastomeric material such as but not limited to silicone and may be coated with a chemically resistant material such as a fluoropolymer or metal alloy. Examples of sealing members useful in the practice of the present invention include but are not limited to butyl rubber septa, butyl rubber septa coated on one side with Teflon® or other fluoropolymer, silicone rubber, silicone rubber septa with a Teflon® layer, or silicone rubber septa with an aluminum coating. The sealing member is a material with a hardness of approximately 30-durometer scale to 70-durometer scale and more preferably in the 45 to 50-durometer range, preferably the sealing member is comprised of silicone. The elastomeric material is preferably self sealing upon withdrawal of the fluid transfer conduit from the sealing member. It may be further desirable that the sealing member be replaced after repeated perforations. Removal of the retaining ring permits removal of the old sealing member and replacement with a new integral member. The permeation rate of such elastomeric materials are chosen to provide the leak integrity to be maintained by the cavity for proper operation of the display device. Sealing member material, its thickness, and its coating may be changed to alter the leak integrity of the sealing member. For example, thicker sealing members and those coated with aluminum will provide better leak integrity compared to thinner, uncoated sealing members.

The sealing member is preferably an elastomeric material that is breached or perforated by a conduit to permit fluid flow into and or out of the cavity. The conduit, for example a needle or cannula, is surrounded or enveloped by the sealing member along a portion of the conduit where it penetrates the sealing member. Upon withdrawal of the conduit, the perforation in the sealing member is closed, self sealed, or resealed and fluid is contained within the space in the housing. The sealing member is elastic and restores to substantially to stop fluid flow. It may also be desirable to further cover a perforated sealing member after withdrawal of the conduit therefrom. Examples to accomplish this include but are not limited to: placement of a second thin sealing member over the first perforated sealing member (the second sealing member may be fixed with another retaining cap or by the adhesive used bond the retaining ring); by inserting a threaded plug with gasket into the retainer through hole; or by filling the through hole of a retainer with an adhesive or sealant like silicone or epoxy.

Fluids that may be transferred into or out of the housing space include gases, liquids, mixtures of liquids and suspended particles and mixtures of these. The gases may include but are not limited to air, nitrogen, noble gases, liquid vapors, outgassing from the display components, decomposition byproducts. Liquids may include those used to suspend display particles and may include but are not limited to dielectrics fluids such as silicone oil or carbon tetrachloroethylene. Liquids may also include but are not limited to suspended particles, such as but not limited to spherical or cylindrical electrically anisotropic particles, charge microparticles, rod shaped or plate-like colloidal particles, and other display media. The liquids may be used to complete filling of the display cavity or for partial or complete replacement of the display media.

Fluid flow may be into or out of the housing cavity or space. Fluid flow may be established by a variety of devices connected to the conduit including but not limited to vacuum pumps, mechanical pumps, gas pressurized fluid sources, or syringes. For example, in FIG. 2b, the conduit 70 second opening 74 may be connected to a vacuum pump. The fluid transfer conduit provides a flow path through the sealing member for flow of fluid into and away from the housing cavity. The transfer device conduit may be a tube and is preferably a metal or an alloy, although any conduit material which is chemically compatible may be used. The sealing member may be pre-scored to facilitate perforation of the sealing member; otherwise the conduit tip is used to perforate the sealing member. A collar surrounding the conduit may be used to stop the conduit at the retainer and prevent pushing the conduit too far into the housing. Conduits may include but are not limited to needles and cannulas. Preferably the conduit will have blunt or square ends, non-coring ends are preferred. The conduits may be one or more concentric or eccentric tubes wherein an outer tube provide for flow of one fluid and an inner tube provide for flow of a second fluid. The conduit may further be connected to a syringe, a pump, or a vacuum source to add or remove fluid from the cavity. The conduit from the fluid transfer device is surrounded by the sealing member that has been passed through it when the sealing member is perforated by the conduit. The sealing member conforms to or envelops a portion of the outside of the fluid transfer conduit so that fluid flow is through the conduit and preferably not through the hole, puncture, or tear in the sealing member.

The retainer may be bonded to a member of the display housing, preferably the rear member, with for example an adhesive or by fusion bonding. The retainer may be made of any material that offers sufficient rigidity to hold and compressing the sealing member to form a fluid tight seal such as a plastic or a metal. Preferably the retainer is a plastic material which includes but are not limited to polycarbonate, nylon, ultra high molecular weight polyethylene, poly(vinylidine fluoride), polyphenylenesulfide, and polyimide. It will be obvious to those skilled in the art that other materials can be easily substituted in place of the materials mentioned including the use of an adhesive to cure and act as a retainer.

The surface of the retainer in contact with the sealing member has one or more through holes and may have one or more enclosed raised ridges to seal against a sealing member and form a seal that provide a tortuous path so that the possibility of fluid leaks is significantly reduced. The retainer may be fabricated by any of the common plastic forming processes such as machining or injection molding, with injection molding being the preferred method. It is important that the sealing member be compressed by the retainer by at least 5% of its thickness and preferably greater than 10% of its thickness but less than 25% of its thickness when installed. The compression of the sealing member may determined, for example, by the thickness of the sealing member, the retainer depth 41 (FIG. 3b), and for example the depth of a recess 22 as shown in FIG. 1 on a housing member 14. This feature makes it possible to ensure a fluid tight seal. In practice, it can be shown that this design provides a fluid tight seal prior to perforation of the sealing member where the inboard leak rate of the housing with fluid exchange device is less than $10^{-7}$ atm-cc/sec, and preferably the leak rate is less than about $10^{-9}$ atm-cc/sec as determined by a helium leak detector.

The arbor may be inserted and secured into a member of the display housing, preferably the rear member, through a hole in the housing member sufficient to permit the arbor to pass through it. It may be desirable to further secured the arbor to the housing with, for example, an adhesive, a mechanical press fit, or by fusion bonding. The arbor may be molded or machined into the housing member. The arbor may be made of any material that is chemically compatible with the display media and offers sufficient rigidity to hold and compressing the sealing member housing to form a fluid tight seal. The arbor may be made of a material including but not limited to a plastic or a metal which may be coated with an inert material such as polytetrafluoroethylene or titanium nitride for chemical resistance. Preferably the arbor is a metal or metal alloy which may include but is not limited to various stainless steels, titanium, and tungsten. It will be obvious to those skilled in the art that other materials can be easily substituted in place of the materials mentioned.

Referring now to the drawings, FIG. 1 shows in perspective the rear side of a display, such as an electronic paper display of the type disclosed in U.S. Pat. No. 4,126,854. A recess 22 in the rear wall of the display typically has a diameter of about 0.500 inches and a depth of about 0.035 inches. A central through hole 12 extends from the bottom of the cavity and member 14 into the interior of the display. A silicone septum 16 slightly less in diameter and greater in thickness of the cavity, eg., 0.315 inches by 0.050 inches, seats on the through hole 12 and is retained in place by a retainer 18. As show in FIG. 3, the retainer may have a diameter of about 0.4960 inches, a thickness of about 0.10 inches, and a through hole 44 having a depth of about 0.062 inches. The enclosed raised edges 43 and 45 in FIG. 3 may be about 0.01 inches in height.

Referring now to FIG. 2b, a method of flowing a fluid into or out of a display device of the present invention includes flowing a fluid through a conduit 70 perforating a sealing member 46 of a fluid exchange device 30 where the fluid exchange device is sealed with a fluid tight seal to a member of a housing of the display device. The conduit 70 perforating the sealing member 46 is enveloped or engaged by the sealing member 46 and the conduit 70 is in fluid communication with the cavity 38 of the display defined by a first member 32 and first electrode 33 and a second member 34 and second electrode 35 of the display device. The method may be used to change the amount of fluid 40 or display media present in the cavity 38; it may be used for maintaining the fluid level, it may be used for complete or partial removal of display media, or it may be used for the removal of gases. Simultaneous transfer of fluid 40 into and out of the display housing cavity may be effected by the use of more than one fluid exchange device or by the use of one or more conduits, including concentric conduits perforating a sealing member of a communication device.

The conduit 70 may be inserted into the sealing member via the through hole 44 in the retaining element 48 and passing the conduit 70 into member through hole 42. The conduit 70 has a first opening 72 and second opening 74 for the flow of fluid through the conduit 70 into or away from the cavity 38. The conduit's second opening 74 may be connected to a fluid pump such as a syringe or peristaltic pump (not shown) to flow fluid into the cavity 38. Upon completion of fluid flow into or out of the cavity 38, the sealing member 46 is re-sealed by removing the conduit 70 from the sealing member 46; fluid flow stops and the sealing member 46 closes the perforation. The fluid level in the cavity 38 is maintained, the pressure integrity is maintain by the re-sealing of the sealing member 46. Alternatively, it may be desirable to cover the perforated sealing member 46 with a second sealing member or a threaded element with gasket (not shown) secured into retainer through hole 44 which may be removed for subsequent perforations and fluid transfers with the cavity 38.

In practice, the septum is punctured with a blunt needle of between 30-gauge and 27-gauge in diameter and more preferably with a 28-gauge needle. Use of a smaller needle increases the fluid transfer time to an unacceptably large value. Use of much larger needles can potentially damage the septum material by causing a remanent hole to be fanned in the septum. Once the septum is punctured with the needle, a fluid transfer path is established between the interior of the package and the outside. Air or fluid can now be withdrawn from the interior cavity of the package or additional fluid added to the interior cavity of the package to maintain the desired fluid level. The invention is used to remove trapped gases in display devices and may also be used to add fluids to such spaces. The advantage of the invention is a low cost, a resealable barrier to fluid flow, and small footprint fluid transfer or communication device.

Although the present invention has been described in considerable detail with reference to certain preferred embodiments thereof, other versions are possible. Therefore the spirit and scope of the appended claims should not be limited to the description and the preferred versions contain within this specification.

What is claimed is:

1. A display device comprising:
    a housing having a first member and a first electrode and a second member and a second electrode in which the first member and first electrode and the second member and second electrode are configured to define a cavity for holding a display medium between the first and second electrodes;
    a fluid exchange device in fluid communication with said cavity by a through hole in said housing, said fluid exchange device including a compressible sealing member to make a fluid-tight seal with said housing.

2. The display device of claim 1 further comprising a conduit perforating the fluid transfer device for flow of fluid into and away from said cavity.

3. The display device of claim 2 wherein the fluid exchange device is sealed following removal of the conduit.

4. The display device of claim 1 wherein said sealing member comprises an elastomeric material.

5. The display device of claim 1 wherein said display medium comprises particles in a dielectric medium.

6. The display device of claim 1 wherein said fluid exchange device further comprises a retainer having a through hole that forms a fluid tight seal between said sealing member and said housing.

7. The display device of claim 1 wherein said fluid exchange device further comprises:
    an arbor secured to said housing and having a through hole, said arbor engaging a housing of said sealing member to form a fluid-tight seal with said housing; and
    a retainer that forms a fluid tight seal between the sealing member and the sealing member housing.

8. The display device of claim 1 further comprising a conduit perforating said sealing member for flow of a fluid into and out of said cavity.

9. The display device of claim 1 wherein said fluid exchange device has a helium leak rate of less than $10^{-7}$ atm-cc/sec.

10. A method of exchanging fluid in a display device comprising:
    flowing a fluid through a conduit that perforates a compressible sealing member of a fluid exchange device, said fluid exchange device being sealed to a housing of said display device, said conduit being engaged by said sealing member and in fluid communication with a cavity of the display device, said cavity defined by a first member and first electrode and a second member and second electrode of said display device.

11. The method of claim 10 wherein the flow of fluid through the conduit changes the amount of fluid present in the cavity.

12. The method of claim 10 further comprising perforating the sealing member with the conduit.

13. The method of claim 10 further comprising removing the conduit from the sealing member to stop fluid flow and close the sealing member.

14. The method of claim 10 wherein said conduit is connected to a syringe.

15. The method of claim 10 wherein said sealing member comprises an elastomeric material.

16. The method of claim 10 wherein fluid transfer into and out of the fluid space occurs at the same time.

* * * * *